(12) United States Patent
Horne

(10) Patent No.: US 8,418,245 B2
(45) Date of Patent: Apr. 9, 2013

(54) METHOD AND SYSTEM FOR DETECTING OBFUSCATORY PESTWARE IN A COMPUTER MEMORY

(75) Inventor: Jefferson Delk Horne, Boulder, CO (US)

(73) Assignee: Webroot Inc., Broomfield, CO (US)

( * ) Notice: Subject to any disclaimer, the term of this patent is extended or adjusted under 35 U.S.C. 154(b) by 943 days.

(21) Appl. No.: 11/334,317

(22) Filed: Jan. 18, 2006

(65) Prior Publication Data

US 2007/0168982 A1    Jul. 19, 2007

(51) Int. Cl.
    *G06F 21/00*    (2006.01)
(52) U.S. Cl. ............... 726/22; 726/23; 726/24; 726/25; 726/26
(58) Field of Classification Search ............ 726/22
    See application file for complete search history.

(56) References Cited

U.S. PATENT DOCUMENTS

| | | | |
|---|---|---|---|
| 5,623,600 A | 4/1997 | Ji et al. | |
| 5,696,822 A | 12/1997 | Nachenberg | |
| 5,832,208 A * | 11/1998 | Chen et al. ................. | 726/24 |
| 6,069,628 A | 5/2000 | Farry et al. | |
| 6,073,241 A | 6/2000 | Rosenberg et al. | |
| 6,092,194 A | 7/2000 | Touboul | |
| 6,154,844 A | 11/2000 | Touboul | |
| 6,167,520 A | 12/2000 | Touboul | |
| 6,310,630 B1 | 10/2001 | Kulkarni et al. | |
| 6,324,650 B1 * | 11/2001 | Ogilvie ........................ | 726/2 |
| 6,367,012 B1 * | 4/2002 | Atkinson et al. ............. | 713/176 |
| 6,397,264 B1 | 5/2002 | Stasnick et al. | |
| 6,460,060 B1 | 10/2002 | Maddalozzo, Jr. et al. | |
| 6,480,962 B1 | 11/2002 | Touboul | |
| 6,535,931 B1 | 3/2003 | Celi, Jr. | |
| 6,611,878 B2 | 8/2003 | De Armas et al. | |
| 6,633,835 B1 | 10/2003 | Moran et al. | |
| 6,667,751 B1 | 12/2003 | Wynn et al. | |
| 6,701,441 B1 | 3/2004 | Balasubramaniam et al. | |
| 6,785,732 B1 | 8/2004 | Bates et al. | |
| 6,804,780 B1 | 10/2004 | Touboul | |
| 6,813,711 B1 | 11/2004 | Dimenstein | |
| 6,829,654 B1 | 12/2004 | Jungek | |

(Continued)

FOREIGN PATENT DOCUMENTS

| | | |
|---|---|---|
| WO | PCT/US07/60711 | 10/2007 |
| WO | PCT/US2006/008883 | 10/2007 |
| WO | PCT/US2007/067082 | 11/2007 |

OTHER PUBLICATIONS

Vasudevan, Amit; Yerraballi, Ramesh. Cobra: Fine-grained Malware Analysis using Stealth Localized-executions. 2006 IEEE Symposium on Security and Privacy. Pub. Date: 2006. Found on the World Wide Web at: http://ieeexplore.ieee.org/stamp/stamp.jsp?tp=&arnumber=1624017.*

U.S. Appl. No. 11/105,978, filed Apr. 14, 2005, J. Horne.

(Continued)

*Primary Examiner* — Nathan Flynn
*Assistant Examiner* — Jeremiah Avery
(74) *Attorney, Agent, or Firm* — Sheridan Ross P.C.

(57) ABSTRACT

A method and system for detecting obfuscatory pestware in a computer memory is described. One illustrative embodiment identifies, within an executable object, a reference to a known procedure, the known procedure having a fixed address in the computer memory; and searches for a predetermined check value at a known offset relative to an address, in the computer memory, of the reference to the known procedure.

9 Claims, 7 Drawing Sheets

U.S. PATENT DOCUMENTS

| | | | |
|---|---|---|---|
| 6,965,968 B1 | 11/2005 | Touboul | |
| 7,058,822 B2 | 6/2006 | Edery et al. | |
| 7,093,239 B1* | 8/2006 | van der Made | 717/135 |
| 7,134,141 B2* | 11/2006 | Crosbie et al. | 726/23 |
| 7,231,667 B2* | 6/2007 | Jordan | 726/23 |
| 7,334,262 B2* | 2/2008 | Szor | 726/22 |
| 7,370,360 B2* | 5/2008 | van der Made | 726/24 |
| 7,418,729 B2* | 8/2008 | Szor | 726/22 |
| 7,552,479 B1* | 6/2009 | Conover et al. | 726/24 |
| 7,624,449 B1* | 11/2009 | Perriot | 726/24 |
| 7,647,633 B2* | 1/2010 | Edery et al. | 726/22 |
| 2003/0065926 A1 | 4/2003 | Schultz | |
| 2003/0115479 A1 | 6/2003 | Edwards | |
| 2003/0159070 A1 | 8/2003 | Mayer | |
| 2003/0174841 A1* | 9/2003 | Nault et al. | 380/277 |
| 2003/0217287 A1 | 11/2003 | Kruglenko | |
| 2004/0030914 A1 | 2/2004 | Kelley et al. | |
| 2004/0034794 A1 | 2/2004 | Mayer et al. | |
| 2004/0064736 A1 | 4/2004 | Obrecht et al. | |
| 2004/0080529 A1 | 4/2004 | Wojcik | |
| 2004/0143763 A1 | 7/2004 | Radatti | |
| 2004/0187023 A1 | 9/2004 | Alagna et al. | |
| 2004/0199827 A1 | 10/2004 | Muttik | |
| 2004/0225877 A1 | 11/2004 | Huang | |
| 2005/0027686 A1 | 2/2005 | Shipp | |
| 2005/0138433 A1 | 6/2005 | Linetsky | |
| 2005/0268338 A1* | 12/2005 | Made | 726/24 |
| 2006/0117387 A1* | 6/2006 | Gunsalus et al. | 726/24 |

OTHER PUBLICATIONS

U.S. Appl. No. 11/105,977, filed Apr. 14, 2005, J. Horne.
U.S. Appl. No. 11/106,122, filed Apr. 14, 2005, J. Horne.
U.S. Appl. No. 11/259,706, filed Oct. 26, 2005, Jefferson D. Horne.
U.S. Appl. No. 11/258,711, filed Oct. 26, 2005, Jefferson D. Horne et al.
U.S. Appl. No. 11/334,307, filed Jan. 18, 2006, Jefferson D. Horne.
Codeguru, Three Ways to Inject Your Code Into Another Process, by Robert Kuster, Aug. 4, 2003, 22 pgs.
Codeguru, Managing Low-Level Keyboard Hooks With the Windows API for VB .Net, by Paul Kimmel, Apr. 18, 2004, 10 pgs.
Codeguru, Hooking the Keyboard, by Anoop Thomas, Dec. 13, 2001, 6 pgs.
Illusive Security, Wolves in Sheep's Clothing: malicious DLLs Injected Into trusted Host Applications, Author Unknown, http://home.arcor.de/scheinsicherheit/dll.htm 13 pgs.
DevX.com, Intercepting Systems API Calls, by Seung-Woo Kim, May 13, 2004, 6 pgs.
Microsoft.com, How to Subclass a Window in Windows 95, Article ID 125680, Jul. 11, 2005, 2 pgs.
MSDN, Win32 Hooks by Kyle Marsh, Jul. 29, 1993, 15 pgs.
PCT Search Report, PCT/US05/34874, Jul. 5, 2006, 7 Pages.
Hruska J; "Virus Detection" European Conference on Security and Detection, XX, XX, Apr. 1997; pp. 128-131; XP000828109.
Yi-Min Wang et al.; "Detecting Stealth Software with Strider Ghostbuster" Dependable Systems and Networks, 2005, DSN 2005, Proceedings, International Conference on Yokohama, Japan 28-0 Jun. 2005, Piscatay, NJ, USA, IEE, Jun. 28, 2005; pp. 368-377; XP010817813; ISBN: 0-7695-2282-3.
Endrijonas, Janet; Chapter 3, "Microcom Virex for the PC version 2.0"; RxPC The Anti-Virus Handbook; 1993; pp. 25-43; TAB Books; Blue Ridge Summit, PA.

* cited by examiner

1

METHOD AND SYSTEM FOR DETECTING OBFUSCATORY PESTWARE IN A COMPUTER MEMORY

RELATED APPLICATIONS

The present application is related to the following commonly owned and assigned applications: U.S. application Ser. No. 11/334,307, "Method and System for Detecting Dependent Pestware Objects on a Computer," filed herewith; U.S. application Ser. No. 11/105,978, "System and Method for Scanning Obfuscated Files for Pestware"; U.S. application Ser. No. 11/105,977, "System and Method for Scanning Memory for Pestware Offset Signatures"; U.S. application Ser. No. 11/106,122, "System and Method for Scanning Memory for Pestware"; and U.S. application Ser. No. 11/259,706, "System and Method for Neutralizing Pestware That Is Loaded by a Desirable Process"; each of which is incorporated herein by reference in its entirety.

FIELD OF THE INVENTION

The invention relates generally to the detection of pestware or malware in computers. More specifically, but without limitation, the invention relates to methods and systems for detecting pestware or malware that employs obfuscation techniques to avoid detection.

BACKGROUND OF THE INVENTION

Protecting personal computers against a never-ending onslaught of "pestware" such as viruses, Trojan horses, spyware, adware, and downloaders on personal computers has become vitally important to computer users. Some pestware is merely annoying to the user or degrades system performance. Other pestware is highly malicious. Many computer users depend on anti-pestware software that attempts to detect and remove pestware automatically.

Anti-pestware software typically scans running processes in memory and files contained on storage devices such as disk drives, comparing them, at expected locations, against a set of "signatures" that identify specific, known types of pestware. Some kinds of pestware avoid detection, however, by using polymorphic obfuscation techniques, metamorphic obfuscation techniques, or both. Polymorphic obfuscation may involve, for example, changing the order of segments (e.g., modules or subroutines) of the pestware's program code during execution. Metamorphic obfuscation may involve, for example, changing specific program instructions to different but equivalent instructions during execution.

One possible solution to the problem of polymorphic and metamorphic obfuscation is to scan memory exhaustively for pestware signatures rather than relying on signatures being at expected locations within executable objects. Scanning memory exhaustively for every known type of pestware, however, can render a computer virtually inoperable for long periods due to the heavy processing burden. Due to the impracticality of scanning memory exhaustively, current anti-pestware software is not always able to detect pestware that employs polymorphic or metamorphic obfuscation techniques.

It is thus apparent that there is a need in the art for an improved method and system for detecting obfuscatory pestware in a computer memory.

SUMMARY OF THE INVENTION

Illustrative embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents and alternative constructions that fall within the spirit and scope of the invention as expressed in the claims.

Embodiments of the invention include methods and systems for detecting obfuscatory pestware in a computer memory. One illustrative embodiment is a method comprising the steps of identifying, within an executable object, a reference to a known procedure, the known procedure having a fixed address in the computer memory; and searching for a predetermined check value at a known offset relative to an address, in the computer memory, of the reference to the known procedure. Another illustrative embodiment is a system for detecting pestware in a computer memory. In this embodiment, a detection module of the system for detecting pestware is configured to identify, within an executable object, a reference to a known procedure, the known procedure having a fixed address in the computer memory; and to search for a predetermined check value at a known offset relative to an address, in the computer memory, of the reference to the known procedure. These and other embodiments are described in more detail herein.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings, wherein:

DETAILED DESCRIPTION

"Pestware," as used herein, refers to any program that damages or disrupts a computer system or that collects or reports information about a person or an organization. Examples include, without limitation, viruses, worms, Trojan horses, spyware, adware, and downloaders. Though pestware may employ polymorphic obfuscation techniques, metamorphic obfuscation techniques, or both to avoid detection, pestware typically contains one or more calls to procedures whose addresses in memory are fixed ("known procedures"). Examples of known procedures include, but are not limited to, application program interfaces (APIs), memory management routines, and computational procedures. Since the addresses of known procedures are unchanging, they can be located within an executing pestware process in spite of the changeability of other aspects of the pestware. One way to identify calls to known procedures is to examine an executable object's import address table (IAT). The address at which a call to a known procedure occurs within a pestware executable object can then serve as a reference or "primer location" from which to begin a scan for an expected, identifying value ("check value"). For example, a predetermined check value may be found at a known offset relative to the address in memory at which the call to the known procedure occurs. A "check value" may be, for example, algorithm code, a string (e.g., a name or uniform resource locator—URL), or any other data that identifies a particular type of pestware.

Figure 1:
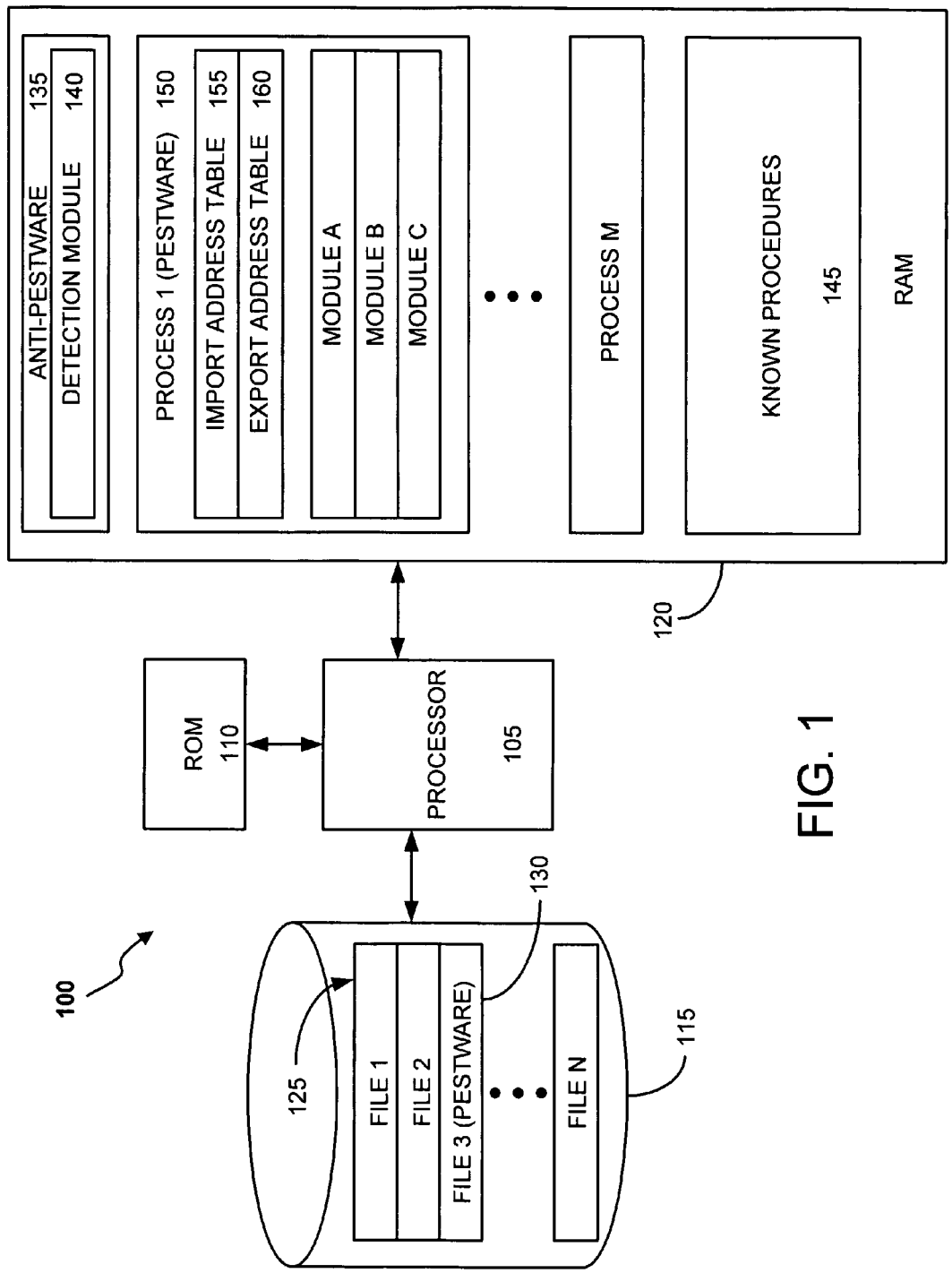
FIG. 1 is a block diagram of a computer protected by a system for detecting pestware, in accordance with an illustrative embodiment of the invention.

Referring now to the drawings, where like or similar elements are designated with identical reference numerals throughout the several views, FIG. 1 is a block diagram of a computer 100 protected by a system for detecting pestware ("anti-pestware"), in accordance with an illustrative embodiment of the invention. "Computer" is used herein to mean any type of electronic device that includes computing functionality, including, without limitation, personal computers (PCs), laptop computers, notebook computers, handheld computers, personal digital assistants (PDAs), servers, and a wide variety of other electronic devices that include a processor and a memory that contains program instructions.

In FIG. 1, processor 105 may communicate with read-only memory (ROM) 110 (e.g., a ROM BIOS), file storage device 115, and random-access memory (RAM) 120. File storage device (e.g., a disk drive), may contain a set of N files 125, one of which—FILE 3 in this example—is pestware 130. RAM 120 may contain a number of running processes, including anti-pestware 135 comprising detection module 140, a set of M running processes other than anti-pestware 135, and a set of known procedures 145 (e.g., APIs). Anti-pestware 135 comprises a system for scanning a computer memory for pestware. Though not shown in FIG. 1, anti-pestware 135 may include other modules for notifying a user that pestware has been detected, shielding computer 100 from pestware, removing pestware from computer 100, or a combination thereof. Detection module 140 is an aspect of anti-pestware 135 that scans the memory of computer 100 (e.g., RAM 120 and file storage device 115) to detect pestware. Though anti-pestware 135 is shown in FIG. 1 as being executed from RAM 120, anti-pestware may, in general, be implemented in software, firmware, hardware, or any combination thereof. In one illustrative embodiment, anti-pestware 135 is implemented as an executable application program that resides on file storage device 115 and that is loaded into and executed from RAM 120 by processor 105. As explained above, known procedures 145 such as APIs have fixed (static) addresses in RAM 120. APIs constitute a "toolbox" of routines built into the operating system that programmers can use to program common tasks. Examples include, without limitation, "read file," "write file," and "access Internet URL."

In FIG. 1, an arbitrary process, "PROCESS 1" (150), is shown with expanded detail. In this example, process 150 is a running pestware process that corresponds to pestware 130 on file storage device 115. Process 150, also termed an "executable object" herein, may include one or more subroutines, indicated in FIG. 1 as MODULES A, B, and C. Process 150 may also include import address table (IAT) 155 and export address table (EAT) 160. In computers running operating systems provided by Microsoft Corp. under the trade name "Windows" (e.g., Windows NT, Windows 2000, and Windows XP), each executable application has an IAT 155 that acts as a lookup table for Windows API calls. Anti-pestware 135 may exploit this aspect of the IAT to locate API calls (or calls to other known procedures) within process 150. Once a call to a known procedure has been located within process 150, the address of that call may be used as a reference point to scan for a check value. For example, it may be known that the check value will be found two bytes from the call to the known procedure, obviating an exhaustive, word-by-word scan of RAM 120. Though the foregoing explanation specifically mentions the Windows operating system, data structures analogous to IAT 155 in other operating systems may be used in implementing the invention for those other operating systems. The principles of the invention are in no way limited in their applicability to the Windows operating system.

Figures 2A, 2B:
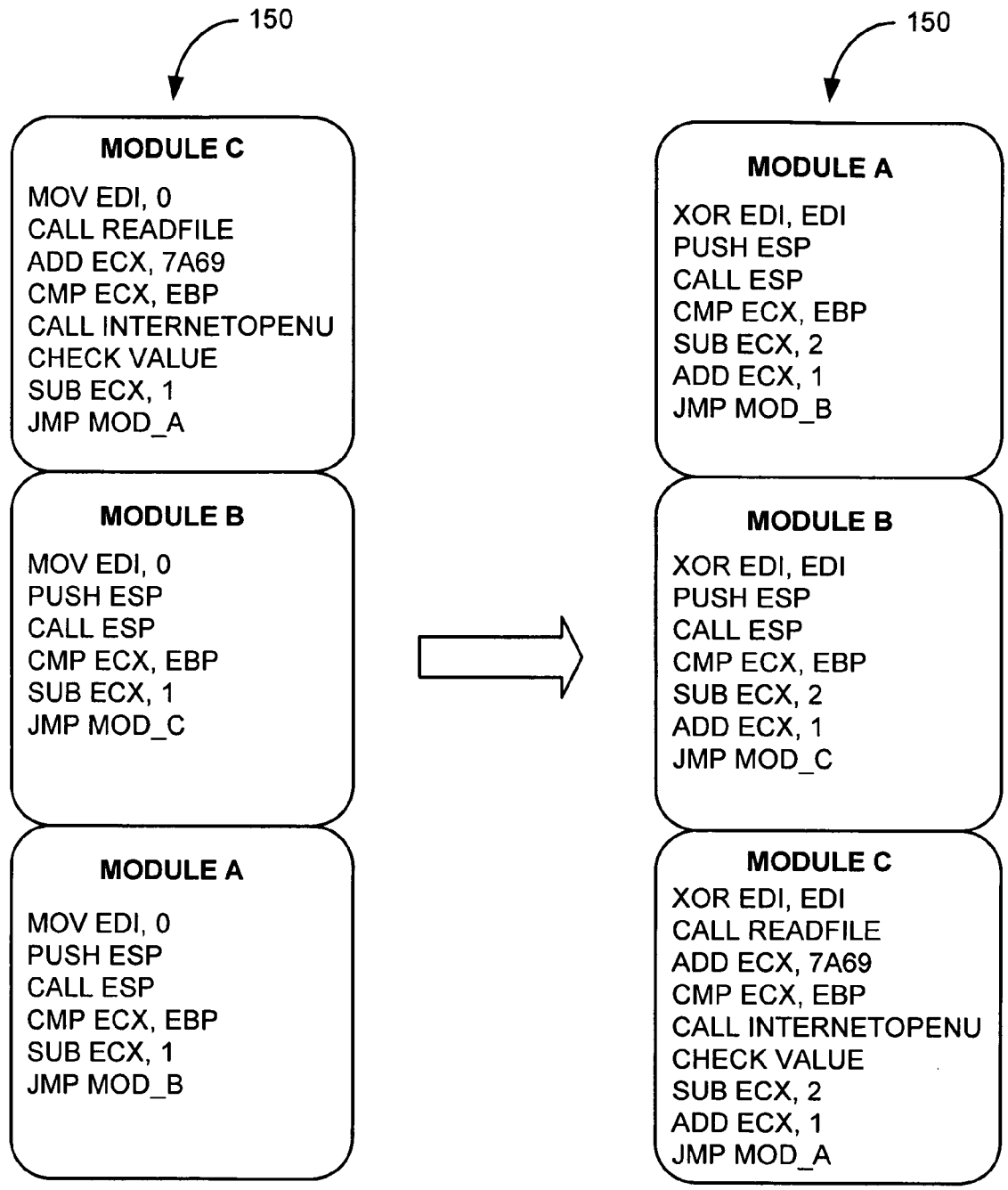
FIGS. 2A and 2B are illustrations showing how some pestware avoids detection by employing polymorphic or metamorphic obfuscation techniques, in accordance with an illustrative embodiment of the invention.

FIGS. 2A and 2B are illustrations showing how some pestware 130 avoids detection by employing polymorphic or metamorphic obfuscation techniques, in accordance with an illustrative embodiment of the invention. FIG. 2A is a diagram of process 150 (recall that process 150 is pestware) showing illustrative assembly-language instructions of Modules A, B, and C. FIG. 2B is a diagram of process 150 after it has employed both polymorphic and metamorphic obfuscation techniques to avoid detection. In FIG. 2B, process 150 has rearranged the order in RAM 120 of Modules A, B, and C (polymorphic obfuscation). Further, process 150 has replaced certain instructions in each module with equivalent instructions (metamorphic obfuscation), thereby changing the size of process 150 and making process 150 look different to prior-art anti-pestware scanning for specific expected characteristics. Specifically, the instruction "MOV EDI, 0" (load zero into register edi) has been replaced by "XOR EDI, EDI" (exclusive or of register edi with itself). Though the two instructions are literally different, they accomplish the same result. Also, "SUB ECX, 1" (subtracting one from register ecx) has been replaced by the two instructions "SUB ECX, 2" and "ADD ECX, 1." Of course, subtracting two and adding one is equivalent to just subtracting one, but the two versions are literally different.

Figure 3:
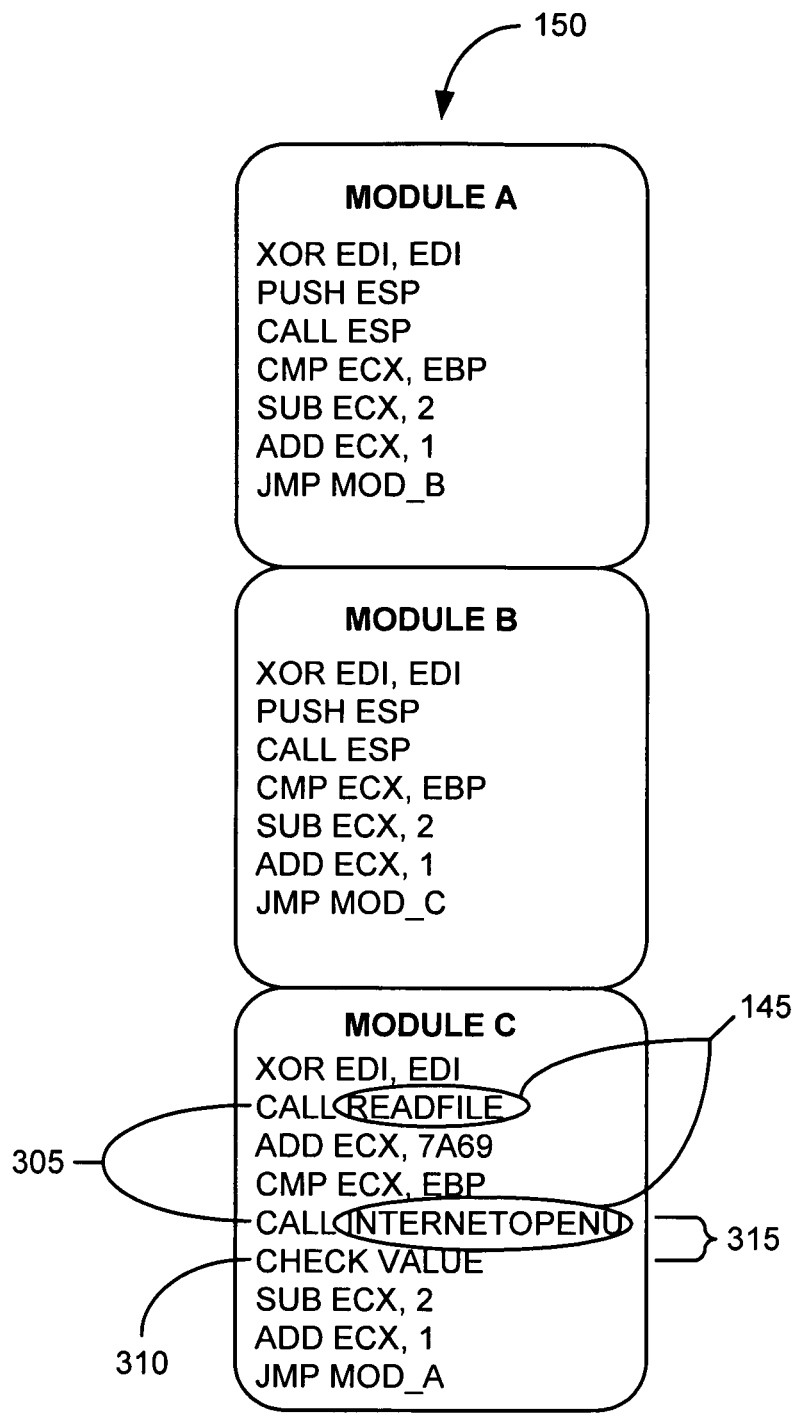
FIG. 3 is an illustration showing how calls to procedures having fixed addresses in memory can be used to find a check value identifying an executable object as pestware, in accordance with an illustrative embodiment of the invention.

FIG. 3 is an illustration showing how a call to a known procedure can be used to find a check value identifying an executable object as pestware, in accordance with an illustrative embodiment of the invention. In FIG. 3, Module C of process 150 includes two calls (or references) 305 to APIs (known procedures 145) that anti-pestware 135 can discover via the IAT 155 of process 150: "CALL READFILE" and "CALL INTERNETOPENU." Detection module 140 of anti-pestware 135 can use a priori knowledge that check value 310 is a known offset 315 from "CALL INTERNETOPENU" in a particular kind of pestware to find check value 310. As explained above, check value 310 may be anything within process 150 that identifies a particular kind of pestware 130. For example, a check value may be algorithm code, a string such as a name or URL (e.g., "abc.com"), or any other identifying data.

Figure 4:
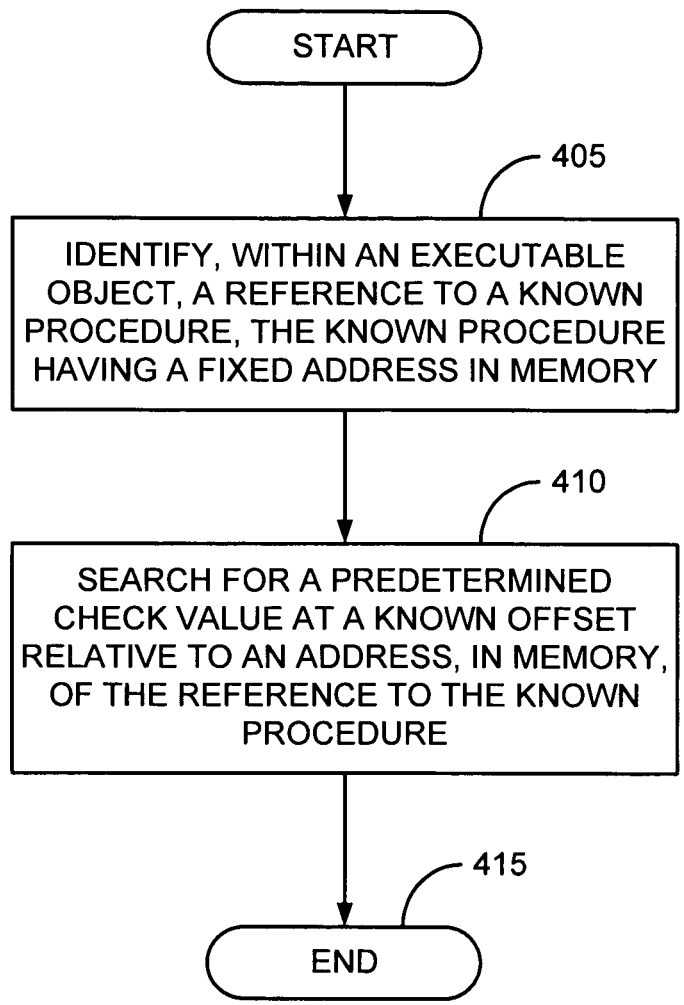
FIG. 4 is a flowchart of the operation of a system for detecting pestware, in accordance with an illustrative embodiment of the invention.

FIG. 4 is a flowchart of the operation of anti-pestware 135, in accordance with an illustrative embodiment of the invention. At 405, detection module 140 may identify, within an executable object (e.g., process 150), a reference 305 to a known procedure 145 such as an API. At 410, detection module 140 may look for a predetermined check value 310 at a known offset 315 relative to the call 305 to the known procedure 145. The process may then, at 415, terminate or proceed to a module of anti-pestware 135 that takes corrective action (e.g., notification, shielding, removal, or some combination thereof).

Figure 5:
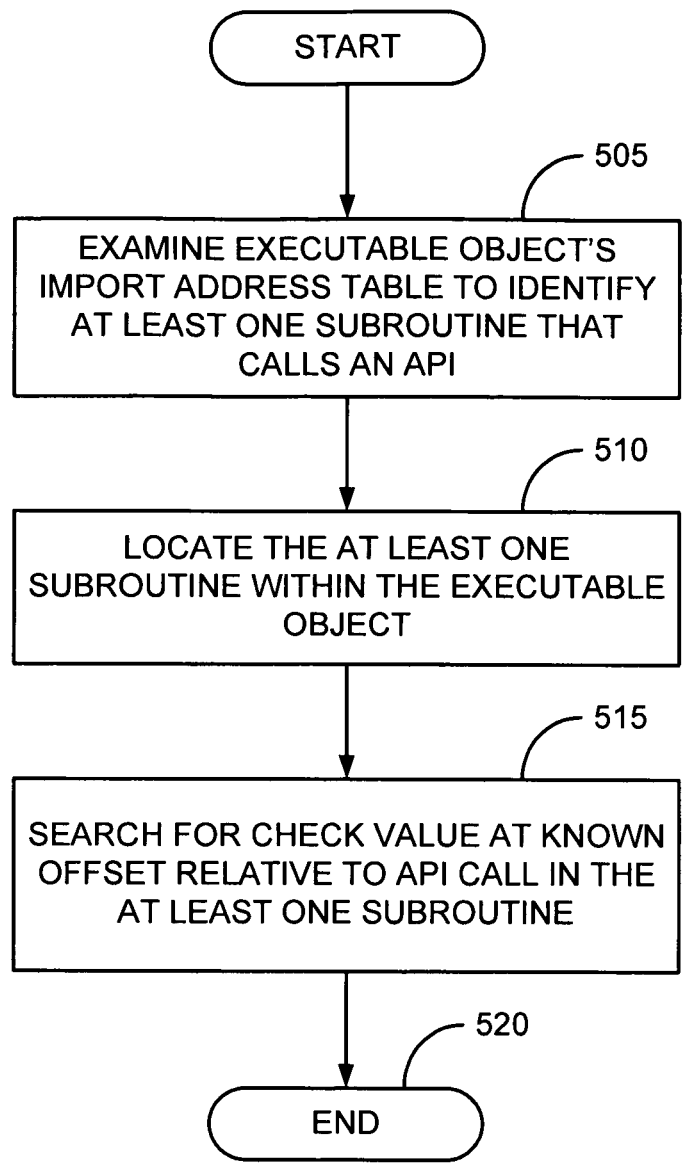
FIG. 5 is a flowchart of the operation of a system for detecting pestware, in accordance with another illustrative embodiment of the invention.

FIG. 5 is a flowchart of the operation of anti-pestware 135, in accordance with another illustrative embodiment of the invention. At 505, detection module 140 may examine an executable object's IAT 155 to identify at least one subroutine within the executable object that calls an API (e.g., "READ FILE"). At 510, detection module 140 may locate that at least one subroutine within the executable object. Once detection module 140 has located, within the at least one subroutine, the API call 305, detection module 140 may, at 515, use the address of that API call 305 as a reference point to scan for a check value 310. Specifically, detection module 140 may search for check value 310 at a known offset 315 from API call 305. The process may then, at 520, terminate or proceed to a module of anti-pestware 135 that takes corrective action (e.g., notification, shielding, removal, or some combination thereof).

Figure 6A:
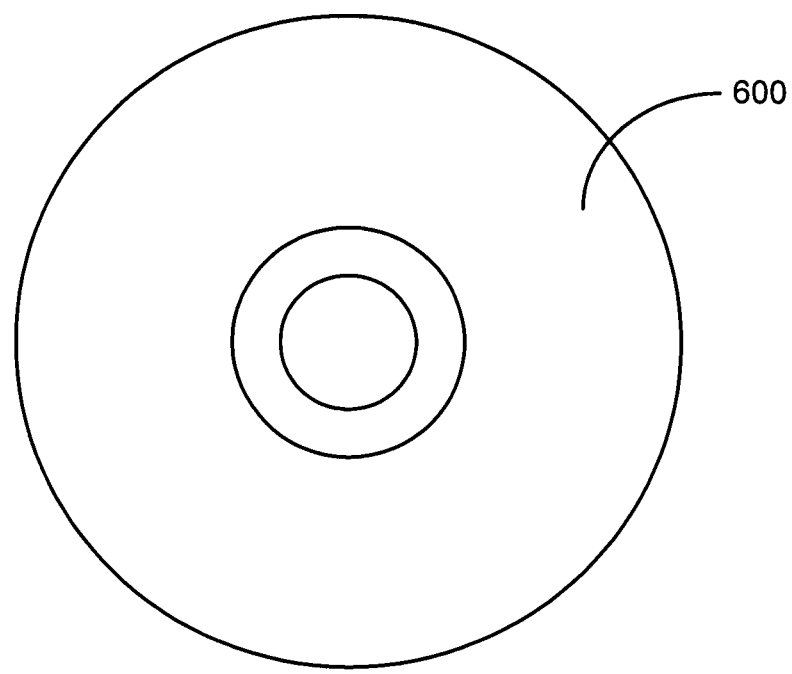
FIG. 6A is an illustration of a computer-readable storage medium containing program instructions to scan for pestware, in accordance with an illustrative embodiment of the invention.

FIG. 6A is an illustration of a computer-readable storage medium 600 containing program instructions (anti-pestware 135) to scan for pestware on computer 100, in accordance with an illustrative embodiment of the invention. Though FIG. 6A depicts, by way of illustration, an optical disc such as a CD-ROM, computer-readable storage medium 600 may be any kind of non-volatile, computer-readable storage medium capable of storing program instructions, including, without limitation, flash memory, ROM, optical discs, and magnetic disks.

Figure 6B:
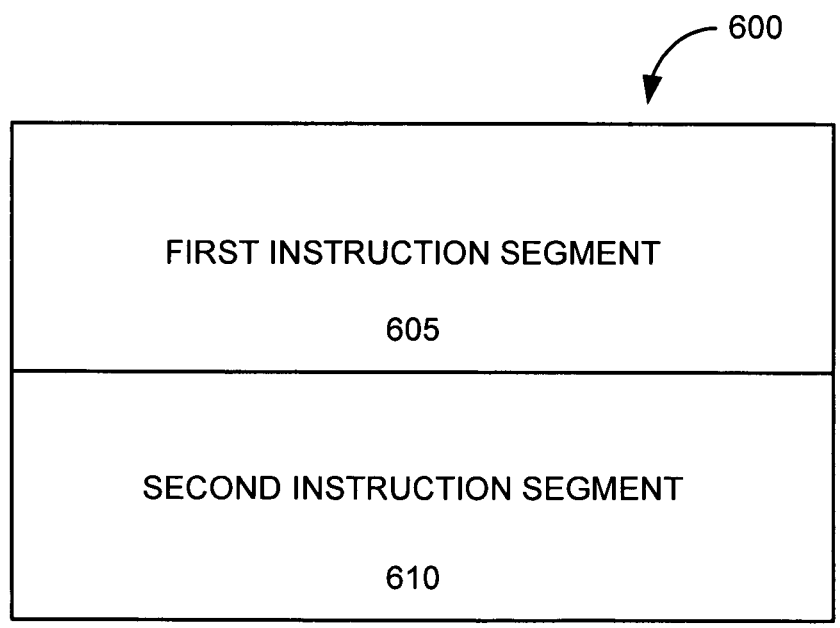
FIG. 6B is a diagram of the elements of a computer-readable storage medium containing program instructions to scan for pestware, in accordance with an illustrative embodiment of the invention.

FIG. 6B is a diagram of the elements of a computer-readable storage medium 600 containing program instructions to scan for pestware (anti-pestware 135), in accordance with an illustrative embodiment of the invention. Computer-readable storage medium 600 may comprise a first instruction segment 605 that identifies, within an executable object in RAM 120, a reference (call) 305 to a known procedure 145, the known procedure 145 having a fixed address in RAM 120. Computer-readable storage medium 600 may also comprise a second instruction segment 610 that searches for a predetermined check value 310 at a known offset 315 relative to an address, in RAM 120, of reference 305.

Figure 6C:
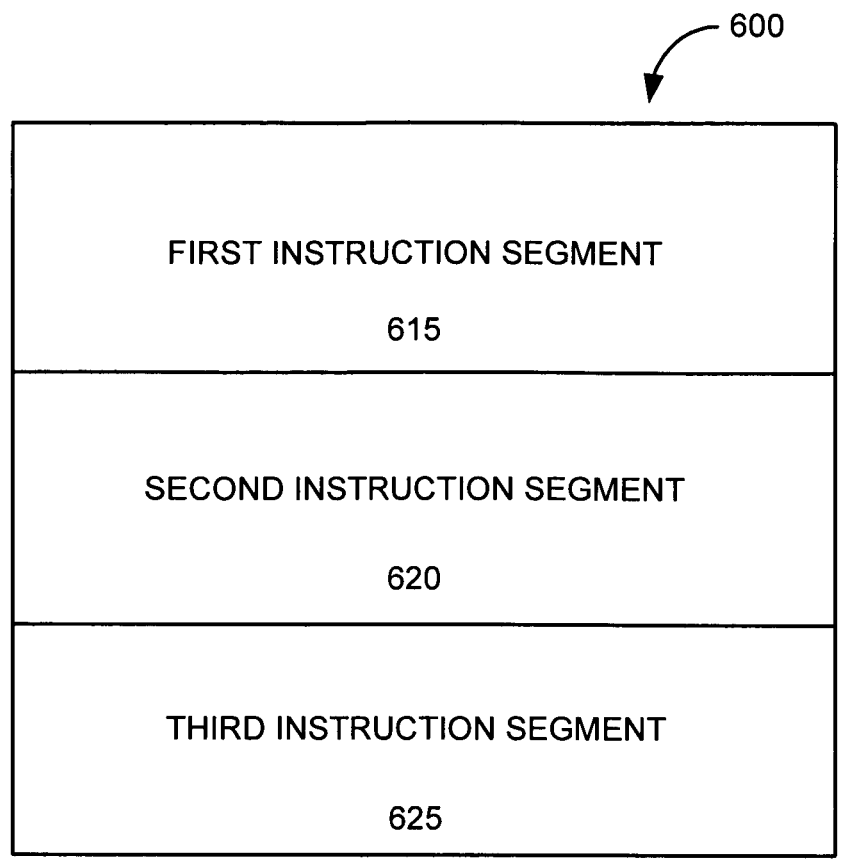
FIG. 6C is a diagram of the elements of a computer-readable storage medium containing program instructions to scan for pestware, in accordance with another illustrative embodiment of the invention.

FIG. 6C is a diagram of the elements of a computer-readable storage medium 600 containing program instructions to scan for pestware (anti-pestware 135), in accordance with another illustrative embodiment of the invention. In FIG. 6C, a first instruction segment 615 of computer-readable storage medium 600 may examine the IAT 155 of an executable object in RAM 120 to identify at least one subroutine that calls an API (known procedure 145), the API having a fixed address in RAM 120. A second instruction segment 620 of computer-readable storage medium 600 may locate, within the executable object, the at least one subroutine containing the API call 305. A third instruction segment 625 may search for a predetermined check value 310 at a known offset 315 relative to the address, in RAM 120, of the API call 305.

In conclusion, the present invention provides, among other things, a method and system for detecting obfuscatory pestware in a computer memory. Those skilled in the art can readily recognize that numerous variations and substitutions may be made in the invention, its use and its configuration to achieve substantially the same results as achieved by the embodiments described herein. Accordingly, there is no intention to limit the invention to the disclosed illustrative forms. Many variations, modifications and alternative constructions fall within the scope and spirit of the disclosed invention as expressed in the claims.

What is claimed is:

1. A method for scanning a computer memory for obfuscatory pestware, comprising:
examining, by a pestware detection module, an import address table (IAT) of an executable object in the computer memory to identify at least one subroutine of the executable object that calls an application program interface (API), the API having a fixed address in the computer memory, the API being known to appear in a particular kind of polymorphic or metamorphic pestware;
locating, by the pestware detection module, the at least one subroutine within the executable object; and
searching, by the pestware detection module, for a predetermined check value at a known offset relative to an address, in the computer memory, at which the at least one subroutine calls the API, the predetermined check value identifying the executable object as the particular kind of polymorphic or metamorphic pestware when the check value is found at the known offset.

2. A system for detecting obfuscatory pestware, comprising:
a process; and
a memory connected with the processor, the memory containing a plurality of program instructions executable by the processor, the plurality of program instructions including a pestware detection module to detect pestware on a computer, the pestware detection module being configured to cause the processor to:
examine an import address table (IAT) of an executable object in a memory of the computer to identify at least one subroutine of the executable object that calls an application program interface (API), the API having a fixed address in the memory, the API being known to appear in a particular kind of polymorphic or metamorphic pestware;
locate the at least one subroutine within the executable object; and
search for a predetermined check value at a known offset relative to an address, in the memory, at which the at least one subroutine calls the API, the predetermined check value identifying the executable object as the particular kind of polymorphic or metamorphic pestware when the check value is found at the known offset.

3. A non-transitory computer-readable storage medium containing program instructions to scan for obfuscatory pestware on a computer, comprising:
a first instruction segment of a pestware detection module that examines an import address table (IAT) of an executable object in a memory of the computer to identify at least one subroutine of the executable object that calls an application program interface (API), the API having a fixed address in the memory, the API being known to appear in a particular kind of polymorphic or metamorphic pestware;
a second instruction segment of the pestware detection module that locates the at least one subroutine within the executable object; and
a third instruction segment of the pestware detection module that searches for a predetermined check value at a known offset relative to an address, in the memory, at which the at least one subroutine calls the API, the predetermined check value identifying the executable object as the particular kind of polymorphic or metamorphic pestware when the check value is found at the known offset.

4. The method of claim 1, wherein the check value includes a uniform resource locator (URL).

5. The system of claim 2, wherein the check value includes a uniform resource locator (URL).

6. The non-transitory computer-readable storage medium of claim 3, wherein the check value includes a uniform resource locator (URL).

7. The method of claim 1, further comprising:
in response to finding the check value at the known offset, performing at least one of notifying a user that pestware has been detected, shielding a computer from pestware, and removing pestware from a computer.

8. The system of claim 2, further comprising:
in response to finding the check value at the known offset, performing at least one of notifying a user that pestware has been detected, shielding a computer from pestware, and removing pestware from a computer.

9. The non-transitory computer-readable storage medium of claim 3, further comprising:
in response to finding the check value at the known offset, performing at least one of notifying a user that pestware has been detected, shielding a computer from pestware, and removing pestware from a computer.

* * * * *